(12) United States Patent
Levy et al.

(10) Patent No.: US 11,944,091 B2
(45) Date of Patent: Apr. 2, 2024

(54) STABLE, SELF-DISPERSIBLE, LOW FOAMING SOLID PESTICIDE FORMULATION

(71) Applicants: Shlomo Levy, Rehovot (IL); Michael Berkovitch, Ashdod (IL); Viacheslav Firer, Beer Sheva (IL)

(72) Inventors: Shlomo Levy, Rehovot (IL); Michael Berkovitch, Ashdod (IL); Viacheslav Firer, Beer Sheva (IL)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 0 days.

(21) Appl. No.: 16/467,388

(22) PCT Filed: Dec. 7, 2017

(86) PCT No.: PCT/IB2017/001629
§ 371 (c)(1),
(2) Date: Jun. 6, 2019

(87) PCT Pub. No.: WO2018/104784
PCT Pub. Date: Jun. 14, 2018

(65) Prior Publication Data
US 2020/0275649 A1 Sep. 3, 2020

Related U.S. Application Data

(60) Provisional application No. 62/431,342, filed on Dec. 7, 2016.

(51) Int. Cl.
| | | |
|---|---|---|
| *A01N 25/12* | (2006.01) | |
| *A01N 43/16* | (2006.01) | |
| *A01N 43/38* | (2006.01) | |
| *A01N 43/707* | (2006.01) | |
| *A01N 43/84* | (2006.01) | |
| *A01N 47/14* | (2006.01) | |
| *A01N 47/44* | (2006.01) | |
| *A01N 57/12* | (2006.01) | |
| *A01N 59/06* | (2006.01) | |
| *C05C 7/00* | (2006.01) | |
| *C05G 3/60* | (2020.01) | |
| *C05G 5/23* | (2020.01) | |

(52) U.S. Cl.
CPC ............ *A01N 25/12* (2013.01); *A01N 43/16* (2013.01); *A01N 43/38* (2013.01); *A01N 43/707* (2013.01); *A01N 43/84* (2013.01); *A01N 47/14* (2013.01); *A01N 47/44* (2013.01); *A01N 57/12* (2013.01); *A01N 59/06* (2013.01); *C05C 7/00* (2013.01); *C05G 3/60* (2020.02); *C05G 5/23* (2020.02)

(58) Field of Classification Search
CPC ........ A01N 25/12; A01N 43/84; A01N 43/44; A01N 57/12; A01N 59/06; A01N 47/44; A01N 43/707; A01N 43/38; C05G 3/60; C05G 5/23; C05C 7/00
See application file for complete search history.

(56) References Cited

U.S. PATENT DOCUMENTS

| | | | |
|---|---|---|---|
| 2,999,293 A | 9/1961 | Taff et al. | |
| 5,082,590 A | 1/1992 | Araud | |
| 5,380,350 A | 1/1995 | Fersch | |
| 5,516,529 A | 5/1996 | Zellweger | |
| 5,580,544 A | 12/1996 | Dao et al. | |
| 5,945,113 A * | 8/1999 | Meinard | A01N 25/04 424/44 |
| 6,255,254 B1 * | 7/2001 | Graber | A01N 25/14 504/367 |
| 6,274,156 B1 | 8/2001 | Ernest | |
| 9,980,481 B2 * | 5/2018 | Knieriem | A01N 25/12 |

FOREIGN PATENT DOCUMENTS

| | | | | |
|---|---|---|---|---|
| CA | 2714065 A1 * | 8/2009 | ............ | A01N 25/12 |
| CN | 1146135 A | 3/1997 | | |
| CN | 1072890 C | 10/2001 | | |
| CN | 1193664 A | 3/2005 | | |
| CN | 1193664 C | 3/2005 | | |
| CN | 1887090 A | 1/2007 | | |
| CN | 1947504 A | 4/2007 | | |
| CN | 103329898 A | 10/2013 | | |
| CN | 103651424 A | 3/2014 | | |
| CN | 104472515 A | 4/2015 | | |
| DE | 36 27 070 A1 | 2/1988 | | |
| DE | 3627070 A1 | 2/1998 | | |
| JP | 59-206301 | 11/1984 | | |
| KR | 10-2012-0112429 A | 10/2012 | | |
| KR | 10-2015-0052499 A | 5/2015 | | |
| WO | WO 1990/00007 A1 | 1/1990 | | |
| WO | WO 92/12637 | 8/1992 | | |
| WO | WO 1993/13658 A1 | 7/1993 | | |
| WO | WO 2005/053399 A1 | 6/2005 | | |

(Continued)

OTHER PUBLICATIONS

International Search Report dated Nov. 5, 2018 in connection with PCT International Application No. PCT/IB2017/001629.
Written Opinion of the International Searching Authority dated Nov. 5, 2018 in connection with PCT International Application No. PCT/IB2017/001629.
First Office Action dated Dec. 22, 2020 in connection with Chinese Application No. 2017800835987 (including English translation).
Office Action dated Jan. 25, 2021 in connection with Israeli Application No. 267061 (including English translation).
Office Action dated Feb. 4, 2021 in connection with Chilean Application No. 1574-2019.
Office Action dated Mar. 12, 2021 in connection with Colombian Application No. NC2019/0007255.

(Continued)

*Primary Examiner* — Robert A Wax
*Assistant Examiner* — Danielle Sullivan
(74) *Attorney, Agent, or Firm* — Gary J. Gershik

(57) ABSTRACT

The present subject matter relates to a stable pesticidal formulation which exhibits improved dispersibility in cold water and full compatibility with fertilizers.

17 Claims, No Drawings

(56) References Cited

FOREIGN PATENT DOCUMENTS

WO     WO 2005/084438 A1     9/2005
WO     WO 2005/117580 A2    12/2005

OTHER PUBLICATIONS

Office Action dated Apr. 6, 2021 in connection with Indonesian Patent Application No. PID201905682.
International Search Report dated May 11, 2018 in connection with PCT International Application No. PCT/IB2017/001629.
Written Opinion of the International Search Authority dated May 11, 2018 in connection with PCT International Application No. PCT/IB2017/001629.
International Preliminary Examination Report dated Jun. 11, 2019 in connection with PCT International Application No, PCT/IB2017/001629, filed Dec. 7, 2017.
Jul. 6, 2021 Response to Office Action filed in connection with Chinese Application No. 2017800835987, including English translation.
Mar. 30, 2021 First Examination Report issued in connection with Indian Patent Application No. 201917024627.
Aug. 3, 2021 Office Action issued in connection with Japanese Patent Application No. 2019-530387, including English translation.
English translation of Nov. 3, 2021 Office Action issued in connection with Chilean Patent Application No. 1574-2019.
Sep. 13, 2021 First Examination Report issued in connection with Australian Patent Application No. 2017371838.
Evonik Industries. "Sipernat specialty and Aerosil fumed silica for defoamer", Technical Information Manual 1313.
Decision to Grant a Patent dated Jan. 24, 2023 issued in Japanese Patent Application 2019-530387, with English language translation attached.
Allowed claims as of Jan. 24, 2023 from Japanese Patent Application 2019-530387, English language translation.
Office Action dated Feb. 4, 2021 in connection with Chilean Application No. 1574-2019, including English machine translation.
Office Action dated Mar. 12, 2021 in connection with Colombian Application No. NC2019/0007255, including English translation.
Sep. 6, 2021 Office Action issued in connection with Ukrainian Patent Application No. a 2019 07483, including English translation.
Dec. 2, 2021 Second Office Action issued in connection with Chinese Application No. 2017800835987, including English translation.
Nov. 19, 2021 Office Action issued in connection with Argentinian Application No. 20170103433, including English translation.
Jul. 28, 2021 Response to Office Action filed in connection with Chilean Patent Application No. 1574-2019, including English translation.
Nov. 30, 2021 Office Action issued in connection with Taiwanese Patent Application No. 106142972, including English summary.
Nov. 8, 2021 Response to Office Action filed in connection with Ukrainian Patent Application No. a 2019 07483, including English translation.
Jul. 29, 2022 Notice of Allowance issued in connection with Colombian Patent Application No. NC2019/0007255, including English machine translation.
Sep. 19, 2022 Notice of Acceptance issued in connection with Australian Patent Application No. 2017371838.
Aug. 18, 2022 Office Action issued in connection with Taiwanese Patent Application No. 106142972, including English summary.
Jul. 5, 2022 Final Office Action issued in connection with Chinese Patent Application No. 2017800835987, including English translation.
Aug. 18, 2022 Office Action issued in connection with Chilean Patent Application No. 1574-2019, including English machine translation.
Aug. 8, 2022 Office Action issued in connection with Argentinian Patent Application No. 20170103433, including English translation.
Sep. 7, 2022 Office Action issued in connection with Australian Patent Application No. 2017371838.
Sep. 5, 2022 Office Action issued in connection with Colombian Patent Application No. NC 2022/0010908, including English machine translation.
Jun. 16, 2022 Office Action issued in connection with Colombian Patent Application No. 2022/0010231, including English machine translation.
Notice of Preliminary Rejection dated Nov. 15, 2022 issued by South Korean Patent Office in connection with South Korean Patent Application No. 10-2019-7019655 with English translation.
Office Action dated Nov. 11, 2022 issued in connection with Brazilian Patent Application No. BR112019011777-6 with English translation.
Decision of Rejection dated Dec. 21, 2022 issued in Colombian Patent Application No. NC2022/0010908 with English machine translation of summary of Office Action.
Communication Pursuant to Article 94(3) EPC dated Feb. 1, 2023 issued in European Patent Application No. 17 842 387.7.
Office Action dated Feb. 24, 2023 issued in Ukrainian Patent Application No. 2019 07483 with English translation.
Office Action dated Mar. 29, 2023 issued in Israeli Patent Application No. 267061 with English translation.

* cited by examiner

STABLE, SELF-DISPERSIBLE, LOW FOAMING SOLID PESTICIDE FORMULATION

This application is a § 371 national stage of PCT International Application No. PCT/IB2017/001629, filed Dec. 7, 2017, claiming the benefit of U.S. Provisional Application No. 62/431,342, filed Dec. 7, 2016, the entire content of each of which are hereby incorporated by reference herein.

Throughout this application, various publications are cited. Disclosures of the documents and publications referred to herein are hereby incorporated in their entireties by reference into this application.

TECHNICAL FIELD

The present subject matter relates to pesticidal formulations for use in agricultural pest control applications. In particular, this subject matter provides a stable pesticidal formulation which exhibits improved dispersibility in cold and hard water and compatibility with fertilizers.

BACKGROUND

Many pesticidal formulations are in the form of solid formulations which are applied under various conditions and/or with other additives such as adjuvant and fertilizer. These agricultural formulations must exhibit excellent chemical stability and a high level of physical stability during the preparation, storage and application process.

However, many solid formulations are unpredictable and complex in nature due to the physical incompatibility of many pesticides and fertilizers especially under severe conditions such as hard and/or cold water. This incompatibility can result in the formation of agglomerates due to coagulation, flocculation, gelling, or precipitation of solid particles of the pesticide in the spray tank. These formulations have generally poor dispersion in water resulting in clogging of the nozzles and filters of spraying equipment.

Formulations in powder form or in granular form are often introduced to the spray tank through a mesh by adding water to the tank. The water available to the farmer may be cold hard water. The hardness of the water may be from 350 ppm to 1000 ppm of calcium carbonate. The temperature of the hard water can be as cold as 4-6° C. Such cold water poorly disperses the active components, thereby leading to clogging the mesh of the spray tank and causing a loss of pesticide. Sometimes it is quite impossible to load the spray tank with all required pesticide portion due to the clogging.

Some granular formulations, comprising for example Captan and Folpet, produce a large amount of foam when added to the spray tank and intensively stirred. High foaming leads to losses of the spraying solution and limits efficiency of the spraying process.

These formulations may thereby produce poor spraying performance with resultant damage to crops and/or ineffectiveness of treatment. It has been recognized that this physical incompatibility could be overcome to some limited extent by the use of combinations containing surfactants, wetting agents and dispersants or by the addition of various compatibility agents.

Based on the fact that no general solution of the incompatibility problem of pesticides and fertilizers exists, there is a need in the art for new pesticidal formulations with improved dispersibility, physical stability, and which are also compatible with fertilizers.

Applying pesticides in a high electrolyte environment results in enormous amounts of foam which makes it difficult to dilute and apply the composition. Based on the aspects discussed above, there is a need in the art for a new pesticidal formulation comprising combinations and applications of auxiliary chemicals which have both high compatibility characteristics and a good environmental safety profile.

When mixing a formulation with cold and/or hard water, there is a need to disintegrate and disperse the resulting particles in order to enhance the dispersibility of the particles.

Increasing disintegration and dispersion of granules in cold water is known in the art using an effervescent agent and increasing the amount of dispersing and wetting agents.

U.S. Pat. No. 6,274,156 discloses effervescent granules which are mixed with pesticidal granules.

U.S. Pat. No. 5,516,529 discloses effervescent granules which comprise water insoluble substances that are capable of absorbing the water.

However, higher amounts of dispersing agent and effervescent agent in a formulation generate increased foam in the presence of water and may lead to increased use of antifoaming agent. Antifoaming agents are sensitive to environment conditions such as temperature and electrolyte.

During the last decade, the need for new agrochemical formulations with high performance has been increasing.

There is a need to develop a highly physically stable formulation, which has high stability during the preparation, storage and application process of the formulation.

SUMMARY

The present invention further provides a stable, self-dispersible, low foaming solid formulation comprising:
   a) at least one pesticide;
   b) an effective amount of an anti-foaming agent; and
   c) an effective amount of effervescent system.

The present invention further provides a stable, self-dispersible, low foaming solid formulation comprising:
   a) at least one pesticide;
   b) an effective amount of a solid or a liquid oil-based anti-foaming agent; and
   c) an effective amount of effervescent system.

The present invention provides a stable, self-dispersible, low foaming solid formulation comprising:
   a) an effective amount of pesticide;
   b) an effective amount of a solid or liquid oil-based anti-foaming agent; and
   c) an effective amount of effervescent system, wherein the formulation is compatible with cold and/or hard water.

The present invention provides a stable, self-dispersible, low foaming solid formulation comprising:
   a) an effective amount of pesticide;
   b) an effective amount of a solid or a liquid oil-based anti-foaming agent; and
   c) an effective amount of effervescent system, wherein the formulation is formulated for application in the presence of cold and/or hard water.

The present invention provides a stable, self-dispersible, low foaming solid formulation comprising:
   a) at least one pesticide in an amount of 25-85% by weight based on the total weight of the formulation;
   b) a solid or a liquid oil-based anti-foaming agent in an amount of up to 10% by weight based on the total weight of the formulation; and c) an effervescent system in an amount of at least 3-25% by weight based on the total weight of the formulation, wherein the formulation is compatible with cold and/or hard water.

The present invention further provides a stable, self-dispersible, low foaming solid formulation comprising:
  a) at least one phthalimide fungicide;
  b) an effective amount of a solid or a liquid oil-based anti-foaming agent; and
  c) an effective amount of effervescent system.

The present invention yet further provides a method of preparing a stable, self-dispersible, low foaming solid formulation comprising a solid antifoaming agent, wherein the method comprises:
  (i) mixing an effective amount of pesticide, an effective amount of the solid anti-foaming agent and an effervescent system; and
  (ii) granulating the mixture to obtain granules.

The present invention yet further provides a manufacturing process of a stable, self-dispersible, low foaming solid formulation comprising a solid antifoaming agent, wherein the manufacturing process comprises:
  (i) mixing an effective amount of a pesticide, an effective amount of the solid anti-foaming agent and an effective amount of effervescent system; and
  (ii) granulating the mixture to obtain granules.

The present invention also provides a method of preparing a stable, self-dispersible, low foaming solid formulation formulations comprising a liquid anti-foaming agent, wherein the method comprises:
  (i) mixing an effective amount of a pesticide and an effective amount of an effervescent system;
  (ii) granulating the mixture to obtain granules; and
  (iii) applying an effective amount of the liquid oil-based anti-foaming agent to the obtained granules.

The present invention also provides a manufacturing process of a stable, self-dispersible, low foaming solid formulation formulations comprising a liquid anti-foaming agent, wherein the manufacturing process comprises:
  (i) mixing an effective amount of a pesticide and an effective amount of an effervescent system;
  (ii) granulating the mixture to obtain granules; and
  (iii) applying an effective amount of the liquid oil-based anti-foaming agent to the obtained granules.

The present invention provides a stable, self-dispersible, low foaming solid formulation comprising:
  a) an effective amount of pesticide;
  b) an effective amount of a solid or a liquid oil-based anti-foaming agent;
  c) an effective amount of dispelling system; and
  d) an effective amount of effervescent system,
wherein the formulation is compatible with cold and/or hard water or is formulated for application in the presence of cold and/or hard water, and wherein the ratio of the effervescent system to the dispelling system is 20:1 to 1:10.

The present invention provides a stable, self-dispersible, low foaming solid formulation comprising:
  a) at least one pesticide in an amount of 25-85% by weight based on the total weight of the formulation;
  b) a solid or a liquid oil-based anti-foaming agent in an amount of up to 10% by weight based on the total weight of the formulation;
  c) a dispelling system in amount of up to 45% by weight based on the total weight of the formulation; and
  d) an effervescent system in an amount of at least 3-25% by weight based on the total weight of the formulation, wherein the formulation is compatible with cold and/or hard water.

The present invention further provides a stable, self-dispersible, low foaming solid formulation comprising:
  a) at least one pesticide;
  b) an effective amount of a solid or a liquid oil-based anti-foaming agent;
  c) a dispelling system in amount of up to 45% by weight based on the total weight of the formulation; and
  d) an effective amount of effervescent system.

The present invention further provides a stable, self-dispersible, low foaming solid formulation comprising:
  a) at least one phthalimide fungicide;
  b) an effective amount of a solid or a liquid oil-based anti-foaming agent;
  c) a dispelling system in amount of up to 45% by weight based on the total weight of the formulation; and
  d) an effective amount of an effervescent system.

The present invention yet further provides a method of preparing a stable, self-dispersible, low foaming solid formulation comprising a solid anti-foaming agent, wherein the method comprises:
  (i) mixing an effective amount of pesticide, an effective amount of the solid anti-foaming agent, and an effervescent system; and
  (ii) granulating the mixture to obtain granules.

The present invention yet further provides a manufacturing process of a stable, self-dispersible, low foaming solid formulation comprising a solid anti-foaming agent, wherein the manufacturing process comprises:
  (i) mixing an effective amount of a pesticide, an effective amount of the solid anti-foaming agent, and an effective amount of effervescent system; and
  (ii) granulating the mixture to obtain granules.

The present invention yet further provides a method of preparing a stable, self-dispersible, low foaming solid formulation comprising a liquid oil-based anti-foaming agent, wherein the method comprises:
  (i) mixing an effective amount of pesticide and an effervescent system;
  (ii) granulating the mixture to obtain granules; and
  (iii) applying an effective amount of the liquid oil-based anti-foaming agent to the obtained granules.

The present invention yet further provides a manufacturing process of a stable, self-dispersible, low foaming solid formulation comprising a liquid oil-based anti-foaming agent, wherein the manufacturing process comprises:
  (i) mixing an effective amount of a pesticide and an effective amount of effervescent system;
  (ii) granulating the mixture to obtain granules; and
  (iii) applying an effective amount of the liquid oil-based anti-foaming agent to the obtained granules.

The present invention yet further provides a method of preparing a stable, self-dispersible, low foaming solid formulation comprising a solid anti-foaming agent, wherein the method comprises:
  (i) mixing an effective amount of pesticide, an effective amount of the solid anti-foaming agent, and an effervescent system; and
  (ii) milling the mixture to obtain powder.

The present invention further provides a method of controlling or preventing a disease caused by phytopathogenic fungi on plants or propagation material thereof, comprising contacting the plants, the locus thereof or propagation material thereof with an effective amount of at least one of the herein defined formulations.

According to another aspect, the present invention provides a method of controlling undesired vegetation comprising applying to a locus of the undesired vegetation an effective amount of at least one of the herein defined formulations.

According to another aspect, the present invention provides a method for controlling unwanted insects comprising applying to an area infested with said insects an effective amount of at least one of the herein defined formulations.

DETAILED DESCRIPTION

Definitions

All technical and scientific terms used herein have the same meanings as commonly understood by someone ordinarily skilled in the art to which the present subject matter belongs. The following definitions are provided for clarity.

As used herein, the term "pesticide" broadly refers to an agent that can be used to control and/or kill a pest. The term is understood to include but is not limited to fungicides, insecticides, nematicides, herbicides, acaricides, parasiticides or other control agents. For chemical classes and applications, as well as specific compounds of each class, see "The Pesticide Manual Thirteenth Edition" (British Crop Protection Council, Hampshire, U K, 2003), as well as "The e-Pesticide Manual, Version 3" (British Crop Protection Council, Hampshire, U K, 2003-04), the contents of each of which are incorporated herein by reference in their entirety.

As used herein the term "plant" or "crop" includes reference to whole plants, plant organs (e.g. leaves, stems, twigs, roots, trunks, limbs, shoots, fruits etc.), plant cells, or plant seeds. This term also encompasses plant crops such as fruits and vegetables. In some embodiments, the term "plant" may include the propagation material thereof, which may include all the generative parts of the plant such as seeds and vegetative plant material such as cuttings and tubers, which can be used for the multiplication of the plant. This includes seeds, tubers, spores, corms, bulbs, rhizomes, sprouts basal shoots, stolons, and buds and other parts of plants, including seedlings and young plants, which are to be transplanted after germination or after emergence from soil.

As used herein, the term "locus" includes not only areas where pests may already exist, but also areas where pests have yet to emerge, and also to areas under cultivation.

As used herein, the term "mixture" or "combination" refers, but is not limited to, a combination in any physical form, e.g., blend, solution, or the like.

As used herein, the term "stable" when used to characterize a solid formulation comprising an effervescent system means that the effervescent system does not substantially react before wetting. For example, the effervescent system does not substantially react when exposed to the moisture present in the air at less than 40% RH or to the moisture in the formulation prior to wetting.

As used herein, the term "low foaming" when used to characterize a solid formulation means that the level of persistent foam is within limits of standard test of SANCO.

As used herein, the term "self-dispersible" refers to the dispersion of micro-particles in the liquid phase without the need for stirring.

The formulations of the subject invention are advantageous because these formulations are self-dispersible and low foaming in the presence of cold and/or hard water.

As used herein, the term "effervescent" refers to the escape of gas from an aqueous solution.

As used herein, the term "dispelling" refers to the dissipation of granules in water to the primary micronized solid particles of active ingredient from which the granules are built.

As used herein, the term "liquid granulation aid" refers to an additive that reduces the friction between particles improves the granulation process by reducing the temperature during the granules production and increases the stability of the formulation components.

As used herein, the term "composition" refers to an undiluted formulation disclosed herein before application.

As used herein, the term "end use composition" refers to a diluted formulation disclosed herein before application.

As used herein, the phrase "agriculturally acceptable carrier" means carriers which are known and accepted in the art for the formation of formulations for agricultural or horticultural use.

As used herein, the term "a" or "an" as used herein includes the singular and the plural, unless specifically stated otherwise. Therefore, the terms "a," "an" or "at least one" can be used interchangeably in this application.

Throughout the application, descriptions of various embodiments use the term "comprising"; however, it will be understood by one of skill in the art, that in some specific instances, an embodiment can alternatively be described using the language "consisting essentially of" or "consisting of."

For purposes of better understanding the present teachings and in no way limiting the scope of the teachings, each numerical parameter should be construed in light of the number of reported significant digits and by applying ordinary rounding techniques. In this regard, used of the term "about" herein specifically includes ±10% from the indicated values in the range. In addition, the endpoints of all ranges directed to the same component or property herein are inclusive of the endpoints, are independently combinable, and include all intermediate points and ranges.

Pesticidal Formulations

Formulation for use in cold water and high electrolyte environment are very sensitive to foam formation and controlling foam formation is difficult due to the dispersing agent, the temperature of the water and the concentration of electrolyte. All these dramatically influence the effectiveness of the antifoaming agent and the concentration.

In addition, formulations comprising an effervescent system are very sensitive to moisture and such solid formulations should contain a very limited amount of water to ensure stability.

The present invention provides a pesticidal formulation which comprises an effervescent system, a dispelling system and an antifoaming agent, wherein the amount of moisture in the formulation is limited and the formulation is stable. In some embodiments, the moisture in the formulation is less than 3%. Preferably, the moisture in the formulation is less than 1%.

The present invention relates to a pesticidal formulation that exhibits good chemical and physical stability under normal storage conditions and also shows improved dispersibility in water and is compatible when mixed with fertilizers.

Chemical and physical stability is commonly considered to be "good" if the formulation passes the following CIPAC test that is standard in the relevant industry before and after storage stability test (2 week at 54° C. or equivalent—after 8 week at 40° C.):

1. Active ingredient (AI) concentration is stable according to the acceptable values in the industry (for example above concentration of 50% AI±25 gr/kg of the declared content);
2. pH (in 1% solution) stable+2;
3. Persistent foam (0.5%) (Temp=5° C.)<60 ml after 1 minute;
4. MT 185-Wet sieve test<1% (10%, 75 μm);
5. Suspensibility (0.5%)>60%;
6. Wettability (10%) (Temp=5° C.) Less than 5 seconds; and
7. PSD, D90<21μ.

Normal storage condition is two years storage at room temperature or under accelerated storage stability test: after 2 weeks at 54° C. or equivalent—after 8 weeks at 40° C. or after 12 weeks at 35° C.

The invention provides a pesticidal formulation that produces a limited and reduced amount of foam.

In some embodiments, the amount of foam is tested by standard CIPAC test. In some embodiments, the anti-foaming agent is effective to reduce persistent foam of 0.5% formulation in cold and/or hard water under standard CIPAC test. Persistent foam may be measured by diluting a formulation in a measuring cylinder of standard dimensions to create a homogenous or heterogenous mixture and inverting the mixture in the measuring cylinder for a predetermined number of times. The amount of persistent foam created and remaining after certain periods of time is measured. For example, a "0.5% formulation" means that a homogeneous or heterogenous mixture comprising 0.5% by weight of the stable, self-dispersible, low foaming solid formulation is used for assessing persistent foam.

The present invention provides a stable, self-dispersible, low foaming solid formulation comprising:
(a) an effective amount of a pesticide;
(b) an effective amount of an anti-foaming agent; and
(c) an effective amount of an effervescent system.

In some embodiments, the anti-foaming agent is a solid anti-foaming agent.

The present invention provides a stable, self-dispersible, low foaming solid formulation comprising:
(a) an effective amount of a pesticide;
(b) an effective amount of a solid anti-foaming agent; and
(c) an effective amount of an effervescent system,
wherein the formulation is compatible with cold and/or hard water.

The present invention provides a stable, self-dispersible, low foaming solid formulation comprising:
(a) an effective amount of pesticide;
(b) an effective amount of a liquid oil-based anti-foaming agent; and
(c) an effective amount of an effervescent system,
wherein the formulation is compatible with cold and/or hard water.

In an embodiment, the formulation is a stable, self-dispersible, low foaming solid formulation comprising:
(a) at least one pesticide in an amount of 25-85% by weight based on the total weight of the formulation;
(b) a solid anti-foaming agent in an amount of up to 10% by weight based on the total weight of the formulation; and
(c) an effervescent system in an amount of at least 3-25% by weight based on the total weight of the formulation;
wherein the formulation is compatible with cold and/or hard water.

In an embodiment, the formulation is a stable, self-dispersible, low foaming solid formulation comprising:
(a) at least one pesticide in an amount of 25-85% by weight based on the total weight of the formulation;
(b) a liquid oil-based anti-foaming agent in an amount of up to 10% by weight based on the total weight of the formulation; and
(c) an effervescent system in an amount of 3-25% by weight based on the total weight of the formulation;
wherein the formulation is compatible with cold and/or hard water.

In some embodiments, the liquid oil-based antifoaming agent is substantially free of water. In some embodiments the liquid oil-based antifoaming agent is free of water.

In some embodiments, the formulation further comprises an amount of a dispelling system. In some embodiments, the amount of the dispelling system is up to 45% by weight based on the total weight of the formulation. In some embodiments, the amount of the dispelling system is more than 0.5% by weight based on the total weight of the formulation. In some embodiments, the amount of the dispelling system is up to 25% by weight based on the total weight of the formulation. In some embodiments, the amount of the dispelling system is about 7.5% to about 16% by weight based on the total weight of the formulation.

In some embodiments, the weight ratio of the effervescent system to the dispelling system is from about 20:1 to about 1:10. In some embodiments, the weight ratio of the effervescent system to the dispelling system is from about 15:1 to about 1:1, preferably from about 14:1 to about 1:1, more preferably from about 7:1 to about 1:1. In some embodiments, the weight ratio of the effervescent system to the dispelling system is about 1:1 to about 1:10, preferably from about 1:10 to about 1:5. In some embodiments, the weight ratio of the effervescent system to the dispelling system is from 7:1 to 1:5. In some embodiments, the weight ratio of the effervescent system to the dispelling system is from about 1:2 to about 1:4.9. The weight ratio between the effervescent system to the dispelling system is critical and influences the rate and amount of foam formation.

In some embodiments, the weight ratio of the effervescent system to the dispelling system is about 1:1.7. In some embodiments, the weight ratio of the effervescent system to the dispelling system is about 1:4.9. In some embodiments, the weight ratio of the effervescent system to the dispelling system is about 1:2. In some embodiments, the weight ratio of the effervescent system to the dispelling system is about 1:1.1. In some embodiments, the weight ratio of the effervescent system to the dispelling system is about 7:1. In some embodiments, the weight ratio of the effervescent system to the dispelling system is about 1.1:1.

In a further embodiment, the pesticidal formulations have the advantage that the antifoaming agent and the dispelling system are already built-in without the need to add additional external components to the spray tank.

A self-dispersible formulation is advantageous also for soluble formulations.

In some embodiments, the effervescent system comprises an acid and a base, preferably a weak acid and a weak base. However, the effervescent system that may be used with the formulations described herein is not limited to the combination of an acid and a base.

Chemical reaction between an acid and a base can result in a rapid spontaneous evolution of $CO_2$ gas when the effervescent system is combined with and wetted by water. In-situ formation of gas enhances solid disintegration and/or particles dispersion.

Acids may include, but are not limited to, organic and inorganic acids. The inorganic acid may be a weak acid. Organic acids may include but are not limited to carboxylic acids such as citric acid, fumaric acid, phthalic acid, maleic acid, malic acid, oxalic acid, adipic acid, glutaric acid, 2-methyl glutaric acid, succinic acid and tartaric acid or any combination thereof.

Bases may include, but are not limited to, organic and inorganic bases. The inorganic base may be a weak base. Inorganic base may include but are not limited to an alkali metal carbonate or bicarbonate such as lithium carbonate, sodium carbonate, sodium bicarbonate, potassium carbonate, potassium bicarbonate or any combination thereof.

In some embodiments, the dispelling system comprises at least one dispersing agent and at least one wetting agent.

Dispersing agents may include, but are not limited to, low-foaming surfactants.

Low-foaming surfactants include, but are not limited to, alkyl naphthalene sulfonate, formaldehyde condensate, condensed methyl naphthalene sulfonate, sodium salt, fatty alcohol ethoxylate, alkoxylated alcohol, silicone surfactant, hydrophobically modified polyacrylate, alcohol alkoxylates, lignosulphonates, and mixtures thereof.

Wetting agents may include, but are not limited to, sodium alkylnaphthalene sulphonate sodium phenolsulphonic acid formaldehyde polycondensed, sodium lauryl sulfate, polyalkoxylated butyl ether and polyarylphenyl ether phosphate.

When mixing the present formulation with cold and/or hard water, there is a need to disintegrate and disperse the resulting particles in order to enhance the suspensibility of the particles.

In some embodiments, the weight ratio of the dispersing agent to the wetting agent is from about 1:10 to about 10:1. In another embodiment, the weight ratio of the dispersing agent to the wetting agent is from about 1:2 to about 6:1. In some embodiments, the weight ratio of the dispersing agent to the wetting agent is 1:2. In some embodiments, the weight ratio of the dispersing agent to the wetting agent is 2:1. In some embodiments, the weight ratio of the dispersing agent to the wetting agent is 6:1.

In an embodiment, the molar ratio of the acid to the base in the formulation is 1:10 to 10:1. In another embodiment, the molar ratio of acid to the base is from about 1:5 to 5:1. In a specific embodiment, the molar ratio of acid to the base is from about 1:2 to 2:1. In a specific embodiment, the molar ratio of the acid to the base is from about 1:0.5 to 1:6. In a specific embodiment, the molar ratio of the acid to the base is from about 1:1.5 to 1:4. In a specific embodiment, the molar ratio of the acid to the base is from about 1:1.5 to about 1:2.

In some embodiment, the amount of the effervescent system in the present formulation is at least 1%, or 2%, or 3%, or 5%, or 10%, or 15%, or 20%, or 25%, or 30%, or 35%, or 40% by weight based on the total weight of the formulation. In another embodiment, the effervescent system is present in the formulation in an amount of about 1-40% by weight based on the total weight of the formulation. In another specific embodiment, the amount of the effervescent system present in the formulation is between about 2 to about 30% by weight based on the total weight of the formulation. In another specific embodiment, the amount of the effervescent system present in the formulation is between about 3 to about 30% by weight based on the total weight of the formulation. In a further embodiment, the amount of effervescent system present in the formulation is between about 5% to about 25% by weight based on the total weight of the formulation. In a further embodiment, the amount of effervescent system present in the formulation is between about 3% to about 25% by weight based on the total weight of the formulation. In a further embodiment, the amount of effervescent system present in the formulation is between about 3% to about 5% by weight based on the total weight of the formulation.

The present invention comprises an antifoaming agent, which may be a liquid oil-based antifoaming or a solid antifoaming agent. In some embodiments, the anti-foaming agent is not Rhodorsil® EP 6703, Geronol AF 80, or SAG 1538. Preferably, the antifoaming agent is a silicon(e)-based antifoaming agent. It is well known that silicon(e)-based antifoaming agents are prone to inactivation during granulation process, storage and in electrolyte environments.

In some embodiments, suitable antifoaming agents are required to withstand the operating conditions of the extrusion process. In some embodiment, the antifoaming agent is capable of withstanding temperatures greater than 50° C. In some embodiments, the antifoaming agent is capable of withstanding temperatures greater than 40° C. In some embodiments, the antifoaming agent is capable of withstanding temperatures greater than 35° C. Further, as the present formulation may be mixed with inorganic salts such as fertilizers, the antifoaming agent suppresses the foaming of the formulation in such a mixture.

In another embodiment, the amount of antifoaming agent in the formulation is 0.1%, or 0.2%, or 0.5%, or 1%, 2%, 3%, 4%, 5%, 6% by weight based on the total weight of the formulation.

In another embodiment, the amount of antifoaming agent in the formulation is about 0.1-30% by weight based on the total weight of the formulation. In another embodiment, the amount of antifoaming agent in the formulation is about 0.1-20% by weight based on the total weight of the formulation. In another specific embodiment, the amount of antifoaming agent present in the formulation is between about 0.2 to about 5% based on the total weight of the formulation. In a further embodiment, the amount of antifoaming agent present in the formulation is between about 0.5 to about 5% based on the total weight of the formulation. In yet a further embodiment, the amount of antifoaming agent present in the formulation is between about 0.5 to about 3% based on the total weight of the formulation. In yet another embodiment, the amount of the antifoaming agent present in the formulation is about 0.2-5% by weight based on the total weight of the formulation. In yet a further embodiment, the amount of antifoaming agent present in the formulation is between about 0.5 to about 2.5% based on the total weight of the formulation. In yet a further embodiment, the amount of antifoaming agent present in the formulation is between about 1% to about 2% based on the total weight of the formulation.

In another embodiment, the amount of antifoaming agent in the formulation is less than 5% by weight based on the total weight of the formulation.

Suitable non-limiting examples of antifoaming agents that may be used in the present formulations include but are not limited to silicon(e) on carrier flowable powders, such as for example polysiloxane on a neutral carrier. An example of a liquid oil-based antifoaming agent that may be used in the present formulations is a liquid based on polydimethyl siloxane oil and silica. In preferred embodiments, the solid anti-foaming agent is Silfoam® SP 150. Silfoam® SP 150 is a polysiloxane silicone-based powder antifoaming agent sold by Wacker Chemie AG.

In some embodiments, the solid antifoaming agent is added to a mixture comprising the pesticide and the effervescent system before milling and granulation.

In another embodiment, the amount of the solid antifoaming agent in the present formulation is at least 0.1%, 0.2%, 0.5%, or 1%, or 5%, or 10%, or 15%, 20% or 30%, by weight based on the total weight of the formulation. In another embodiment, the amount of the solid antifoaming agent present in the formulation is about 0.2-5% by weight based on the total weight of the formulation. In another embodiment, the amount of the solid antifoaming agent present in the formulation is about 1% to about 2% by weight based on the total weight of the formulation.

In another embodiment, the amount of the liquid oil-based antifoaming agent in the present formulation is at least 0.1%, 0.2%, 0.5%, or 1%, or 5%, or 10%, or 15%, 20% or 30%, by weight based on the total weight of the formulation. In another embodiment, the amount of the liquid oil-based antifoaming agent present in the formulation is about 0.2-5% by weight based on the total weight of the formulation.

In some embodiments, the formulation is in powder form. In some embodiments, the formulation is in granule form. In some embodiments, the formulation is in tablet form. In some embodiments, the tablet is a soluble tablet. In some embodiments, the tablet is a dispersible tablet. The formulation may in the form of a water dispersible granule (WDG), soluble granule (SG), wettable powder (WP) or a soluble powder (SP). Preferably, the formulation is the form of a water dispersible granule.

In one embodiment, the pesticides are in the form of a solid.

Formulations of the present invention may comprise pesticides which have a melting point of at least 70° C., at least 75° C., at least 80° C., at least 85° C., at least 90° C., at least 95° C. or at least 100° C. Preferably, the pesticides of the present subject matter have a melting point of at least 100° C.

The pesticides refer to fungicides, herbicides, insecticides, and nematicides, and any combination thereof.

Fungicides may include but are not limited to strobilurins, phthalimides fungicides, azoles fungicides or any combination thereof.

In specific embodiments, fungicides may include but are not limited to azoxystrobin, buprofezin, Captan, merpan, Folpet, chlorothalonil, cymoxanil, cyazofamid, diflubenzuron, dimethomorph, fipronil, fosetyl aluminum, prochloraz (zinc complex), tebuconazole or any combination thereof.

Insecticides may include but are not limited to organochlorides, neonicotinoids, pyrethroids avermectine, dinotefuran or any combination thereof.

In specific embodiments, insecticide may include but are not limited to imidacloprid, novaluron, pymetrozine, thiamethoxam, cartap, emamectin benzoate or any combination thereof.

Herbicides may include but are not limited to imidazolinones, sulfonylureas, carbamates triazines or any combination thereof.

In specific embodiments, herbicides may include but are not limited to atrazine, DCPA, nicosulfuron or any combination thereof.

In some embodiments, the pesticide is Captan. In some embodiments, the pesticide is Folpet. In some embodiments, the pesticide is a combination of fosetyl-aluminum, Folpet and dimethomorph. In some embodiments, the pesticide is a combination of cartap and emamectine benzoate. In some embodiments, the pesticide is merpan. In some embodiments, the pesticide is a combination of pymetrozine and dinotefuran.

In an embodiment, the amount of pesticides in the formulation are about 0.1-99 wt. %, about 0.1-95 wt. %, or about 0.1-90 wt. %, based on the total weight of the formulation. In a specific embodiment, the pesticides are present in a concentration of at least 20%, 30%, 40%, 50%, 60%, 70%, 80%, 90% by weight based upon the total weight of the formulation. In a specific embodiment, the pesticide is preferably present in a concentration of at least 70% by weight, of at least 75% by weight, of at least 80% by weight, of at least 85% by weight, of at least 90% by weight, of at least 95% by weight based upon the total weight of the formulation. In an embodiment, the pesticides are present in a concentration of about 70-95% based upon the total weight of the formulation. In an embodiment, the pesticides are present in a concentration of about 40-95% based upon the total weight of the formulation. In an embodiment, the pesticides are present in a concentration of about 25-85% based upon the total weight of the formulation. In an embodiment, the pesticides are present in a concentration of about 80-85% based upon the total weight of the formulation.

In some embodiments, the present formulation further comprises a wetting agent.

Non-limiting examples of wetting agents used in the present subject matter include low-foaming surfactant for example sodium alkylnaphthalene sulphonate, sodium phenolsulphonic acid formaldehyde polycondensed, sodium lauryl sulfate, polyalkoxylated butyl ether and polyarylphenyl ether phosphate.

In some embodiments, the amount of wetting agent in the formulation is about 0.1-15% by weight based on the total weight of the formulation. In another specific embodiment, the amount of wetting agent present in the formulation is between about 0.5 to about 12% based on the total weight of the formulation. In a further embodiment, the amount of wetting agent present in the formulation is between about 0.5 to about 6% based on the total weight of the formulation. In a further embodiment, the amount of wetting agent present in the formulation is between about 2.5 to about 4.5% based on the total weight of the formulation.

In another embodiment, the amount of wetting agent in the formulation is less than 10% by weight based on the total weight of the formulation.

Wetting agents may include, but are not limited to, sodium alkylnaphthalene sulphonate sodium phenolsulphonic acid formaldehyde polycondensed, sodium lauryl sulfate, polyalkoxylated butyl ether and polyarylphenyl ether phosphate.

In some embodiments, the formulation further comprises a dispersing agent.

Dispersing agents may include, but are not limited to, low-foaming surfactants.

Low-foaming surfactants include, but are not limited to, alkyl naphthalene sulfonate formaldehyde condensate, alkoxylated alcohol, silicone surfactant, condensed methyl naphthalene sulfonate, sodium salt, fatty alcohol ethoxylate, silicone surfactant, hydrophobically modified polyacrylate, lignosulphonates and mixtures.

In some embodiments, the amount of dispersing agent in the formulation is less than 30% by weight based on the total weight of the formulation. In some embodiments, the amount of dispersing agent in the formulation is less than 20% by weight based on the total weight of the formulation. In another specific embodiment, the amount of dispersing agent present in the formulation is between about 1 to about 20% based on the total weight of the formulation. In a further embodiment, the amount of dispersing agent present in the formulation is between about 2 to about 16% based on the total weight of the formulation. In a further embodiment, the amount of dispersing agent present in the formulation is between about 2.5 to about 11% based on the total weight of the formulation.

In some embodiments, the formulation further comprises a granulation aid agent. The granulation aid agent works as a lubricant, reduces the friction in the granulation process and results in reducing the temperature during granulation.

Granulation aid agents may include, but are not limited to, polyethylene glycol and polypropylene glycol alkylated polyalkoxylated glycol.

In some embodiments, the granulation aid agent is solid. In some embodiments, the granulation aid agent is liquid. In some embodiments, the granulation aid agent may be prepared as a solution in granulation water.

In another embodiment, the amount of the granulation aid agent in the formulation is at least 0.1%, or 0.2%, or 0.5%, or 1%, or 1.5%, or 2%, or 2.5% by weight based on the total weight of the formulation. In another embodiment, the amount of the granulation aid agent is less than 10% by weight based on the total weight of the formulation. In another embodiment, the amount of the granulation aid agent is about 2% by weight based on the total weight of the formulation.

In some embodiments, the formulation further comprises additives. In some embodiments, the formulation further comprises fillers. In an embodiment, the filler is a solid filler. In some embodiments, the formulation further comprising an agriculturally acceptable carrier.

In some embodiments, the formulation further comprises buffers, drying agents, processing agents, adjuvants, safeners, adhesives, neutralizers, binders, sequestrates, stabilizers, antioxidants or mixtures thereof.

In some embodiments, the buffer is citrate, phosphate, acetate, or mixtures thereof. In some embodiments, the drying agent is sodium aluminosilicate. In some embodiments, the processing agent is amorphous silica, fumed silica, or mixtures thereof.

In a further embodiment, the pesticidal agricultural formulation discussed herein is an agrochemical formulation comprising:
  (a) at least one pesticide in amount of at least of 25-85% by weight based on the total weight of the formulation;
  (b) a solid antifoaming agent in an amount of 0.5%-30% by weight based on the total weight of the formulation; and
  (c) an effervescent system in an amount of 3-25% by weight based on the total weight of the formulation.

In a further embodiment, the pesticidal agricultural formulation discussed herein is an agrochemical formulation comprising:
  (a) at least one pesticide in amount of at least of 25-85% by weight based on the total weight of the formulation;
  (b) a liquid oil-based antifoaming agent in an amount of 0.5%-30% by weight based on the total weight of the formulation; and
  (c) an effervescent system in an amount of 3-25% by weight based on the total weight of the formulation.

The present invention further provides a stable, self-dispersible, low foaming solid formulation comprising:
  a) at least one pesticide;
  b) an effective amount of solid anti-foaming agent; and
  c) an effective amount of effervescent system.

The present invention further provides a stable, self-dispersible, low foaming solid formulation comprising:
  a) at least one pesticide;
  b) an effective amount of liquid oil-based anti-foaming agent; and
  c) an effective amount of effervescent system.

The present invention further provides a stable, self-dispersible, low foaming solid formulation comprising:
  a) at least one phthalimide fungicide;
  b) an effective amount of a solid anti-foaming agent; and
  c) an effective amount of effervescent system.

The present invention further provides a stable, self-dispersible, low foaming solid formulation comprising:
  a) at least one phthalimide fungicide;
  b) an effective amount of a liquid oil-based anti-foaming agent; and
  c) an effective amount of effervescent system.

The present invention provides a stable, self-dispersible, low foaming solid formulation comprising:
  a) an effective amount of pesticide;
  b) an effective amount of a solid anti-foaming agent;
  c) an effective amount of dispelling system; and
  d) an effective amount of effervescent system,
wherein the formulation is compatible with cold and/or hard water.

The present invention provides a stable, self-dispersible, low foaming solid formulation comprising:
  a) an effective amount of pesticide;
  b) an effective amount of a liquid oil-based anti-foaming agent;
  c) an effective amount of dispelling system; and
  d) an effective amount of effervescent system,
wherein the formulation is compatible with cold and/or hard water.

The present invention provides a stable, self-dispersible, low foaming solid formulation comprising:
  a) at least one pesticide in an amount of 25-85% by weight based on the total weight of the formulation;
  b) a solid anti-foaming agent in an amount of up to 10% by weight based on the total weight of the formulation;
  c) dispelling system in an amount of up to 45% by weight based on the total weight of the formulation, and
  d) an effervescent system in an amount of 3-25% by weight based on the total weight of the formulation,
wherein the formulation is compatible with cold and/or hard water.

The present invention provides a stable, self-dispersible, low foaming solid formulation comprising:
  a) at least one pesticide in an amount of 25-85% by weight based on the total weight of the formulation;
  b) a liquid oil-based anti-foaming agent in an amount of up to 10% by weight based on the total weight of the formulation;
  c) a dispelling system in an amount of up to 45% by weight based on the total weight of the formulation, and
  d) an effervescent system in an amount of 3-25% by weight based on the total weight of the formulation,
wherein the formulation is compatible with cold and/or hard water.

The present invention further provides a stable, self-dispersible, low foaming solid formulation comprising:
  a) at least one pesticide
  b) an effective amount of a solid anti-foaming agent;
  c) a dispelling system in an amount of up to 45% by weight based on the total weight of the formulation; and
  d) an effective amount of effervescent system.

The present invention further provides a stable, self-dispersible, low foaming solid formulation comprising:
 a) at least one pesticide
 b) an effective amount of a liquid oil-based anti-foaming agent;
 c) a dispelling system in an amount of up to 45% by weight based on the total weight of the formulation; and
 d) an effective amount of effervescent system.

The present invention further provides a stable, self-dispersible, low foaming solid formulation comprising:
 a) at least one phthalimide fungicide;
 b) an effective amount of a solid anti-foaming agent;
 c) a dispelling system in an amount of up to 45% by weight based on the total weight of the formulation; and
 d) an effective amount of effervescent system.

The present invention further provides a stable, self-dispersible, low foaming solid formulation comprising:
 a) at least one phthalimide fungicide;
 b) an effective amount of a liquid oil-based anti-foaming agent;
 c) a dispelling system in an amount of up to 45% by weight based on the total weight of the formulation; and
 d) an effective amount of effervescent system.

In an embodiment of the present invention, the formulation further comprises a granulation aid agent.

In an embodiment of the present invention, the formulation further comprising a solid filler and/or an agriculturally acceptable carrier.

In some embodiment, the granulation aid agent can be prepared as a solution prior to granulation.

Other ingredients, such as adhesives, neutralizers, binders, sequestrates, stabilizers, buffers and/or antioxidants, may also be added to the present formulations in order to increase the stability, of the described formulations.

Fertilizers that are compatible with the present formulation are generally electrolytic and may be refers but not limited to calcium chloride, calcium nitrate, magnesium chloride, magnesium nitrate, ammonium nitrate, ammonium sulfate, anhydrous ammonia, calcium nitrate/urea, oxamide, potassium nitrate, urea, urea sulfate, ammoniated superphosphate, diammonium phosphate, nitric phosphate, potassium carbonate, potassium metaphosphate, calcium chloride, magnesium ammonium phosphate, magnesium sulfate, ammonium sulfate, potassium sulfate. Such fertilizers are known to those of ordinary skill in the art.

The present formulation is also substantially compatible with micronutrient formulations containing elements such as boron, cobalt, copper, iron, magnesium, molybdenum, potassium, sodium, sulfur and zinc ions.

Due to the electrolytic nature of the fertilizer, when the formulations discussed herein are mixed with fertilizers, the resulting highly electrolytic mixture may become inhospitable to certain components of the formulation. As such, each of the components of the abovementioned formulation shall be compatible in an electrolyte water solution.

The agricultural formulations herein may be mixed with water and/or fertilizers and may be applied pre-emergence and/or post-emergence to a desired locus by any means, such as airplane spray tanks, knapsack spray tanks, cattle dipping vats, farm equipment used in ground spraying (e.g., boom sprayers, hand sprayers), and the like. The desired locus may be soil, plants, and the like.

As used in the present methods, the formulations discussed herein may be applied jointly or in a succession with a fertilizer. That is, the pesticidal formulation and a fertilizer may be applied jointly or in succession.

Further, the agricultural formulations herein may be used in conjunction with one or more other pesticides to control a wider variety of undesirable pests. When used in conjunction with other pesticides, the herein described formulation may be formulated with the other pesticide/s, tank mixed with the other pesticide/s or applied sequentially with the other pesticide/s. In addition, the herein described formulation may, optionally, be combined with or blended with other pesticide formulations. This blend of pesticides may be used to control pests in crops and non-crop environments.

The present formulation may include additional crop protection agents, for example, bio-stimulants, molluscicides, growth regulators, biological agents, fertilizers, or mixtures thereof. When used in conjunction with additional crop protection agents, the formulation can be formulated with these co-agents, tank mixed with the co-agents or applied sequentially with the co-agents.

In some embodiments, the pesticidal formulation is stable when moisture present in the air at less than 40% RH. In some embodiments, the formulation is stable when the moisture present in the air is 40% RH or greater than 40% RH. In some embodiments, the formulation is stable when the moisture present in the air is from 40% RH to 50% RH. In some embodiments, the formulation is stable when the moisture present in the art is from 50% RH to 60% RH.

In some embodiments, the pesticidal formulation is stable when stored for at least 2 weeks at a temperature of 54° C.

According to an embodiment, the pesticidal formulation may readily disperse in hard water. In some embodiments, the water has a hardness of 120-1000 ppm of calcium carbonate. In some embodiments, the water has a hardness of 180-1000 ppm of calcium carbonate. In some embodiments, the water has a hardness, of 300-1000 ppm of calcium carbonate.

According to an embodiment, the pesticidal formulation may readily disperse in cold water. In some embodiments, the cold water has a temperature of less than 9° C. In some embodiments, the cold water has a temperature of 5-9° C. In some embodiments, the cold water has a temperature of 2-8° C. In some embodiments, the temperature of the cold water may be as cold as 4-6° C. or less than 4° C.

Formulations of the present subject matter may be processed using an extrusion processing. Alternatively, one or more of the following methods may be used to process the formulation: (1) mixing agglomeration, (2) pan or drum granulation, (3) fluid bed granulation.

In an embodiment, the herein disclosed formulation has improved dispersion properties. In some embodiments, the pesticidal formulation disperses in less than 10 minutes, preferably in less than 5 minutes, and more preferably the pesticidal formulation disperses instantly upon contact with water, including hard and/or cold water.

The present invention also provides a package comprising any one of the formulations described herein, wherein the package is impermeable to moisture. As used herein, the term "impermeable" when used to characterize a package means that the package is sufficiently impermeable to moisture such that the effervescent system comprised in the formulation contained in the package does not substantially react when the package is exposed to humid air. For example, the package may be made of aluminum metallized film laminates.

Preparation of the Dispersible Stable Formulation

The present invention yet further provides a method of preparing a stable, self-dispersible, low foaming solid formulation comprising a solid anti-foaming agent, wherein the method comprises:
- (i) mixing an effective amount of pesticide, an effective amount of the solid anti-foaming agent, and an effervescent system; and
- (ii) granulating the mixture to obtain granules.

In some embodiments, the method further comprises mixing an amount of a dispelling system during step (i).

The present invention provides a manufacturing process of a stable, self-dispersible, low foaming solid formulation comprising a solid anti-foaming agent, wherein the manufacturing process comprises:
- (i) mixing an effective amount of a pesticide, an effective amount of the solid anti-foaming agent and an effective amount of an effervescent system; and
- (ii) granulating the mixture to obtain granules.

The present invention yet further provides a manufacturing process of a stable, self-dispersible, low foaming solid formulation comprising, a solid anti-foaming agent, wherein the manufacturing process comprises:
- (i) mixing an effective amount of a pesticide, an effective amount of the solid anti-foaming agent, dispelling system and an effective amount of effervescent system; and
- (ii) granulating the mixture to obtain granules.

The present invention yet further provides a method of preparing a stable, self-dispersible, low foaming solid formulation comprising a liquid oil-based anti-foaming agent, wherein the method comprises:
- (i) mixing an effective amount of pesticide and an effervescent system;
- (ii) granulating the mixture to obtain granules; and
- (iii) applying an effective amount of the liquid oil-based anti-foaming agent to the obtained granules.

The present invention also provides a manufacturing process of the formulations of the present invention comprising a liquid anti-foaming agent, wherein the process comprises:
- (i) mixing an effective amount of a pesticide and an effective amount of an effervescent system;
- (ii) granulating the mixture to obtain granules; and
- (iii) applying an effective amount of the liquid oil-based anti-foaming agent to the obtained granules.

The present invention yet further provides a manufacturing process for a stable, self-dispersible, low foaming solid formulation comprising a liquid oil-based anti-foaming agent, wherein the manufacturing process comprises:
- (i) mixing an effective amount of pesticide, a dispelling system and an effective amount of an effervescent system;
- (ii) granulating the mixture to obtain granules; and
- (iii) applying an effective amount of the liquid oil-based anti-foaming agent to the obtained granules.

In some embodiments, the effective amount of the liquid oil-based anti-foaming agent is applied to the obtained granules and is absorbed onto the surface of the granules. In some embodiments, the effective amount of the liquid oil-based anti-foaming agent is applied to the obtained granules and forms a liquid layer over the surface of the granules.

In some embodiments, the effective amount of the liquid oil-based anti-foaming agent is applied by spraying.

The present invention yet further provides a method of preparing a stable, self-dispersible, low foaming solid formulation comprising a solid anti-foaming agent, wherein the method comprises:
- (i) mixing an effective amount of pesticide, an effective amount of the solid anti-foaming agent, and an effective amount of an effervescent system; and
- (ii) milling the mixture to obtain powder.

In some embodiments, the method further comprising mixing an amount of a dispelling agent during step (i).

The present invention provides a manufacturing process of a stable, self-dispersible, low foaming solid formulation comprising a solid anti-foaming agent, wherein the manufacturing process comprises:
- (i) mixing an effective amount of a pesticide, an effective amount of the solid anti-foaming agent and an effective amount of an effervescent system; and
- (ii) milling the mixture to obtain powder.

The present invention yet further provides a manufacturing process of a stable, self-dispersible, low foaming solid formulation comprising a solid anti-foaming agent, wherein the manufacturing process comprises:
- (i) mixing an effective amount of a pesticide, an effective amount of the solid anti-foaming agent, dispelling system and an effective amount of effervescent system; and
- (ii) milling the mixture to obtain powder.

In some embodiments, the process further comprises a step of milling of the mixture of step (i) to the desired particle size distribution prior to performing step (ii). In some embodiments, the desired particle size distribution is $D(90)<35$ microns. In some embodiments, the desired particle size distribution is $D(90)<26$ microns. In some embodiments, the desired particle size distribution is $D(90)<22$ microns. In some embodiments, the desired particle size distribution is $D(90)<20$ microns. In some embodiments, the desired particle size distribution is $D(90)<19$ microns.

In some embodiments, the manufacturing process comprises further mixing a dispelling system with the mixture of step (i) prior to performing step (ii).

In some embodiments, the dispelling system comprises at least one dispersing agent and at least one wetting agent.

In some embodiments, the weight ratio of the effervescent system to the dispelling system is from about 20:1 to about 1:10. In some embodiments, the weight ratio of the effervescent system to the dispelling system is from about 15:1 to about 1:1, preferably from about 14:1 to about 1:1, more preferably from about 7:1 to about 1:1. In some embodiments, the weight ratio of the effervescent system to the dispelling system is about 1:1 to about 1:10, preferably from about 1:10 to about 1:5. preferable from 7:1 to 1:5. In some embodiments, the weight ratio of the effervescent system to the dispelling system is from about 1:2 to about 1:4.9. The weight ratio between the effervescent system to the dispelling system is critical and influences the rate and amount of foam formation.

In some embodiments, the weight ratio of the effervescent system to the dispelling system is about 1:1.7. In some embodiments, the weight ratio of the effervescent system to the dispelling system is about 1:4.9. In some embodiments, the weight ratio of the effervescent system to the dispelling system is about 1:2. In some embodiments, the weight ratio of the effervescent system to the dispelling system is about 1:1.1. In some embodiments, the weight ratio of the effervescent system to the dispelling system is about 7:1. In some embodiments, the weight ratio of the effervescent system to the dispelling system is about 1.1:1.

In some embodiments, the manufacturing process comprises further mixing a dispersing agent with the mixture of step (i) prior to performing step (ii). In some embodiments, the process comprises further mixing a wetting agent with the mixture of step (i) prior to performing step (ii). In some embodiments, the process further comprises adding a granulation aid agent to the mixture of step (i).

In some embodiments, the pesticide is milled prior to performing step (i).

In some embodiments, the method or manufacturing process further comprises a step of compressing the obtained granules or powder to obtain a tablet. In some embodiments, the method or manufacturing process further comprises a step of compressing the obtained granules to obtain a tablet. In some embodiments, the method manufacturing process further comprises a step of compressing the obtained powder of to obtain a tablet.

Methods of Use

The formulations described herein are suitable for the control of undesirable vegetation, fungal pathogens, bacteria, insects or nematodes. Methods of using the pesticidal formulations of the subject invention include adding the pesticidal formulation to a carrier such as water and using the resulting dispersion or solution containing the pesticidal formulation for spray applications to control the undesirable vegetation, fungal pathogens, bacteria or insects in crop or non-crop environments.

Effective application rates of the pesticidal formulation cannot generally be defined, as it varies depending upon various conditions such as the type of pesticide, target pest, weather conditions, and the type of crop.

In an embodiment, the formulation is diluted in a carrier at rate from about 1 to 100 kg of the pesticidal formulation per 1000 L of the carrier. In a further embodiment, the formulation is diluted in a carrier at a rate from about 1 to 30 kg of the pesticidal formulation per 1000 L of the carrier. In yet another embodiment, the formulation is diluted in a carrier at a rate from about 5 to 15 kg of the pesticidal formulation per 1000 L of the carrier. In an embodiment, the carrier is water.

In some embodiments, the formulation is applied with a fertilizer. In some embodiments, the formulation is tank mixed with the fertilizer. In some embodiment, the formulation is applied sequentially with the fertilizer.

In an embodiment, the fertilizer is diluted in a carrier at a rate from about 1 to 100 kg per 1000 L of the carrier. In a further embodiment, the fertilizer is diluted in a carrier at a rate from about 1 to 30 kg per 1000 L of the carrier. In yet another embodiment, the fertilizer is diluted in a carrier at a rate from about 2 to 20 kg per 1000 L of the carrier. In some embodiments, the carrier is water.

Preparation and Application of the End Use Composition

The present invention also provides an end use composition of the formulation described herein.

The end use composition of the present invention can be obtained by diluting the formulation described herein with a carrier such as water.

The solid formulation may be added to the tank after water is added.

The solid formulation may be added to the tank by washing the formulation over a mesh which is placed on the tank.

The present formulations are diluted with water before use to produce an aqueous composition which is used in crop protection. In some embodiments, the aqueous composition which is used in crop protection is a solution. In some embodiments, the aqueous composition which is used in crop protection is a dispersion.

In some embodiments, the end use composition is a solution. In some embodiments, the end use composition is a dispersion.

In some embodiments the formulation is wetted to form suspension concentrate formulation prior to dilution.

In some embodiments the formulation is wetted to form concentrated liquid formulation prior to dilution.

Each embodiment disclosed herein is contemplated as being applicable to each of the other disclosed embodiments. Thus, all combinations of the various elements described herein are within the scope of the invention. In addition, the elements recited in formulation embodiments can be used in the method, process and use embodiments described herein and vice versa.

EXAMPLES

Formulation Example 1

One exemplary embodiment of the formulation is illustrated in Table 1, below:

TABLE 1

| Raw Material | Quantity for 1000 Kg |
|---|---|
| Captan | 780 Kg (100%) 830 as 94% |
| Supragil ® MNS/90 | 25 |
| Supragil ® WP | 55 |
| Citric acid | 20 |
| Sodium bicarbonate | 30 |
| Silfoam ® SP 150 | 20 |
| ETHYLAN ® NS 500 LQ | 20 |

This formulation was prepared by mixing the Captan with Supragil® MNS/90, Supragil® WP, citric acid, sodium bicarbonate and Silfoam® SP 150 in a mixer until the powders dispersed homogeneously. The premix was then milled until a particle size distribution of d90<22 micron was achieved. A portion of the premix was milled with a Micronizer jet mill and a second portion was milled with a centrifugal mill.

The milled premix was wetted with granulation water containing 9% of ETHYLAN® NS 500 LQ in a mixer. The wetted powder was extruded in an extrusion granulator through 0.8-2 mm screen and the granules were dried in fluidized bed dryer. The dried granules were then sieved.

The formulation demonstrated good dispersibility and low foaming under the following field application conditions: hard water (water (D) 342 PPM), cold water temperature (5-9° C.) and mixing with up to 15 kg fertilizers/1000 L; fertilizers contained calcium (for example Fertilizer $Ca(NO_3)_2$—Calcinit ($Ca^{+2}$: 19%; CaO: 26.5%). Results are presented in Tables 2-3.

TABLE 2

| Parameters | Normal Limits | Before Storage | Storage at room temperature | Storage at 54° C. for 2 weeks |
|---|---|---|---|---|
| Appearance | | Yellowish breakable granules | Yellowish breakable granules | Yellowish breakable granules |
| Captan concentration | 78-82% | 76.6 | 76.2 | 76.2 |
| pH(1%) | 6-10 | 9.22 | 9.44 | 8.42 |
| Persistent foam (0.5%)(Temp = 5° C.) | ≤60 ml after 1 min. | 0 ml | 0 ml | 0 ml |
| Wet Sieve Residue (10%, 45 μm) (Temp = 5° C.) | ≤1% | <<1% | <1% | <<1% |
| Suspensibility (0.5%) | >60% | | 80.07 | 73.46 |
| Wettability (Temp = 5° C.) | | 16 | 20 | 24 |

TABLE 3

Results from spray tank test

| | Storage at room temperature | Storage at 54° C. for two weeks |
|---|---|---|
| Amount of formulation | 5 kg | 5 kg |
| Amount of fertilizer | 15 kg Ca(NO₃)₂ | 15 kg Ca(NO₃)₂ |
| Wash water temperature | 6° C. | 8° C. |
| tank temperature | 13° C. | 12° C. |
| Washing volume | 77 liter | 108 liter |
| Washing ratio (W/L) | 1:16 | 1:21 |
| foaming | No foaming observed | No foaming observed |
| filter | Clean-no residues observed | Clean-no residues observed |
| Sieve basket | Clean-no residues observed | Clean-no residues observed |
| nozzles | No clogging of the nozzles observed | No clogging of the nozzles observed |

Formulation Example 2

One exemplary embodiment of the formulation is illustrated in Table 4, below:

TABLE 4

| Raw Material | Quantity for 1000 Kg |
|---|---|
| Folpet | 800 Kg (100%) |
| Agrilan ® 789 | 25 |
| Supragil ® WP | 60 |
| Citric acid | 20 |
| Sodium bicarbonate | 35 |
| Silfoam ® SP 150 | 25 |
| ETHYLAN ® NS 500 LQ | 10 |

This formulation was prepared by mixing the Folpet with Agrilan® 789, Supragil® WP, citric acid, sodium bicarbonate and Silfoam® SP 150 in a mixer until the powders dispersed homogeneously. The premix was then milled until a particle size distribution of d90<19 micron was achieved. A portion of the premix was milled with a Micronizer jet mill and a second portion was milled with a centrifugal mill. The type of milling had no impact on the results detailed herein below.

The milled premix was wetted with granulation water containing 4.5% of ETHYLAN® NS 500 LQ in a mixer. The wetted powder was extruded in an extrusion granulator through 0.8-2 mm screen and the granules were dried in fluidized bed dryer. The dried granules were then sieved.

The formulation demonstrated good dispersibility and low foaming under the following field application conditions: hard water (water (D) 342 PPM), cold water temperature (5-9° C.) and mixing with up to 15 kg fertilizers/1000 L; fertilizers contained Calcium (for example Fertilizer Ca(NO₃)₂—Calcinit (Ca$^{+2}$: 19%; CaO: 26.5%). Results are presented in Tables 5-6.

TABLE 5

| Parameters | Storage at room temperature | Storage at 54° C. for 2 weeks |
|---|---|---|
| Appearance | White breakable granules | White breakable granules |
| Folpet concentration. | 79.2% | 79.2% |
| pH(1%) | 9.4 | 8.9 |
| Persistent foam (0.5%)(Temp = 5° C.) | 0 | 0 |
| Wet Sieve Residue (10%, 45 μm) (Temp = 5° C.) | <<1% | <<1% |
| Suspensibility (0.5%) | 80% | 80% |
| Wettability (Temp = 5° C.) | 17 | 17 |

TABLE 6

Results from spray tank test - ~100 gr/L concentration of fertilizer Ca(NO₃)₂

| Batch | A | B |
|---|---|---|
| Conditions | Storage at room temperature | Storage at 54° C. for 2 weeks |
| Appearance | Yellowish breakable granules | Yellowish breakable granules |
| Folpet Concentration (%) | 79.2% | 79.2% |
| Weight (kg) | 5.4 | 4.0 |
| Persistent Foam (1%, 5° C.) | No foaming observed | No foaming observed |
| Washing Volume (L) | 104 | 77 |
| Washing ratio (W/L) | 01:19.3 | 01:19.5 |
| Wash water temperature | 6° C. | 6.0° C. |
| Tank temperature | 8° C. | 8° C. |
| Washing time (minutes) | 01:30 | 01:15 |
| Filter | Clean no residues observed | Clean no residues observed |
| Sieve basket | Clean no residues observed | Clean no residues observed |
| Nozzles | No clogging of the nozzles observed | No clogging of the nozzles observed |

Formulation Example 3

One exemplary embodiment of the formulation is illustrated in Table 7, below:

TABLE 7

| Raw Material | Quantity for 1000 Kg |
|---|---|
| Fosetyl-Aluminum | 500 Kg (100%) |
| Folpet | 250 Kg (100%) |
| Dimethomorph | 50 Kg (100%) |
| Berol 08 | 20 |
| Supragil ® WP | 45 |
| Citric acid | 25 |

TABLE 7-continued

| Raw Material | Quantity for 1000 Kg |
|---|---|
| Sodium bicarbonate | 45 |
| Silfoam ® SP 150 | 20 |
| ETHYLAN ® NS 500 LQ | 15 |

This formulation was prepared by mixing the fosetyl-aluminum, Folpet and dimethomorph with Berol 08, Supragil® WP, citric acid, sodium bicarbonate and Silfoam® SP 150 in a mixer until the powders dispersed homogeneously. The premix was then milled until a particle size distribution of d90<19 micron was achieved. A portion of the premix was milled with a Micronizer jet mill and a second portion was milled with a centrifugal mill. The type of milling had no impact on the results detailed herein below.

The milled premix was wetted with granulation water containing 4.5% of ETHYLAN® NS 500 LQ in a mixer. The wetted powder was extruded in an extrusion granulator through 0.8-2 mm screen and the granules were dried in fluidized bed dryer. The dried granules were then sieved.

The formulation demonstrated good dispersibility and low foaming under the following field application conditions: hard water (water (D) 342 PPM), cold water temperature (5-9° C.) and mixing with up to 15 kg fertilizers/1000 L; fertilizers contained Calcium (for example Fertilizer $Ca(NO_3)_2$—Calcinit ($Ca^{+2}$: 19%; CaO: 26.5%). Results are presented in Tables 8-9.

TABLE 8

| Test | Normal Limits | Initial Results | Final Results |
|---|---|---|---|
| Appearance | Off-white granules | Off-white granules | Off-white granules |
| Fosetyl-Aluminum concentration | 47.5-52.5% | 51.1% | 51.1% |
| Folpet concentration | 23.75-26.25% | 25.4 | 25.3 |
| Dimethomorph concentration | 4.5-5.5% | 5.1 | 5.3 |
| pH (1% in water) | 2.5-4.0 | 3.3 | 3.1 |
| Wettability (10%) (5° C.) | <30 | >30 | >30 |
| Wettability (10%) (room temperature) | <30 | 25 | 30 |
| Persistent Foam (3%) (5° C.) | Max. 60 ml after 1 min. | 5 | 10 |
| Persistent Foam (3%) (room temperature) | Max. 60 ml after 1 min. | 0 | 15 |
| Sieve test Residue | <1% | <<1% | <<1% |
| Particle size D(90) μm | ≤22-35 | 24 | 31 |

TABLE 9

Results from spray tank test

| | Storage at room temperature |
|---|---|
| Amount of formulation | 3.35 kg |
| % formulation | 3% |
| Wash water temperature | 3° C. |
| tank temperature | 15° C. |
| Washing volume | 40 liter |
| Washing ratio (W/L) | 1:12 |
| foaming | No foaming observed |
| filter | Clean - no residues observed |
| Sieve basket | Clean - no residues observed |
| nozzles | No clogging of the nozzles observed |

Formulation Example 4

One exemplary embodiment of the formulation is illustrated in Table 10, below:

TABLE 10

| Raw Material | Quantity for 1000 Kg |
|---|---|
| Cartap HCl Tech. | 250 Kg (261 Kg for 96.0%) |
| Emamectine Benzoate Tech. | 10 Kg (11 Kg for 97.0%) |
| Supragil ® WP | 5 Kg |
| Sodium bicarbonate | 28 Kg |
| Citric acid | 42 Kg |
| Silfoam ® SP 150 | 7 Kg |
| Ionol ® CP | 20 Kg |
| ETHYLAN ® NS 500 LQ | 5 Kg |
| Lactose | Up to 1000 kg (about 621 kg) |

1. Stage A: Preparation of Premix:

The Cartap HCl Tech. and the Emamectine Benzoate Tech. were mixed with Supragil® WP, citric acid, sodium bicarbonate, Silfoam® SP 150, Ionol® CP and lactose to prepare the premix. The premix was milled to particle size distribution of d90<20 micron.

2. Stage B: Granulation:

The premix was wetted with approximately 13% granulation water contained 4% of ETHYLAN® NS 500 LQ (as previously prepared solution). Extrusion granulation through 0.8 mm screen was performed and the granules were dried in fluidized bed dryer. The dried granules were sieved.

Stability test results for this formulation is summarized in Table 11, below:

TABLE 11

| | Normal Limits | Initial Results | Final Results |
|---|---|---|---|
| Appearance | Yellowish breakable granules | White granules | White granules |
| Cartap HCl conc. | 23.0-27.0% | 27.5 | 27.5 |
| Emamectin Benzoate conc. | 0.8-1.2% | 1.03 | 1.0 |
| pH(1%) | 3-6 | 4.98 | 4.91 |
| Wettability | | Less then 5 sec | Less then 5 sec |
| Persistent foam (0.5%) | ≤60 ml after 1 min. | 8 ml | 8 ml |
| WSR (10%, 45 μm) | ≤1% | o.k | o.k |
| Dilution Stability-after 5 minutes | | o.k | o.k |
| Dilution Stability-after 18 hours | | o.k | o.k |

Formulation Example 5

One exemplary embodiment of the formulation is illustrated in Table 12, below:

TABLE 12

| Raw Material | Quantity for 1000 Kg |
| --- | --- |
| Merpan tech. | 500 Kg<br>(532 Kg for 94.0%) |
| Agrilan 789 (hydrophobically modified poly aery late/Acrylic Copolymer) | 20 Kg |
| Supragil ® WP (sodium Diisopropylnaphthalenesulphonate) | 25 Kg |
| Morwet D-500 (sodium salt of naphthalene sulfonate condensate (NSC) with block copolymer) | 100 Kg |
| Ufoxane 3A (Sodium lignosidphonate) | 10 Kg |
| Ammonium sulfate | 78.5 Kg |
| Sodium bicarbonate | 78.5 Kg |
| Silfoam ® SP 150 (Polysiloxane Silicone-based powder antifoam agent) | 20 Kg |
| Ethylan ® NS 500 LQ - (non-ionic surfactant, polyalkoxylated butyl ether) | 15.0 Kg |
| Corn Starch | Up to 1000 kg<br>(about 121.0 kg) |

TABLE 13

| Appearance | Light brown granule |
| --- | --- |
| pH(1%) | 7-9 |
| Bulk density | 0.6 gr/ml |
| PSD D(90)µ | <20µ |

This formulation was prepared by mixing the merpan with Agrilan® 789, Supragil® WP, Morwet D500, Ufoxan 3A, ammonium sulfate, sodium bicarbonate, corn starch and Silfoam® SP 150 in a mixer until the powders dispersed homogeneously. The premix was then milled until a particle size distribution of d90<19 micron was achieved. A portion of the premix was milled with a Micronizer jet mill and a second portion was milled with a centrifugal mill. The type of milling had no impact on the results detailed herein below.

The milled premix was wetted with granulation water containing 4.5% of ETHYLAN® NS 500 LQ in a mixer. The wetted powder was extruded in an extrusion granulator through 0.8-2 mm screen and the granules were dried in fluidized bed dryer. The dried granules were then sieved.

Formulation Example 6

One exemplary embodiment of the formulation is illustrated in Table 14, below:

TABLE 14

| Raw Material | Quantity for 1000 Kg |
| --- | --- |
| Pymetrozine tech. | 293 Kg<br>(298 Kg for 98.0%) |
| Dinotefuran tech | H7 Kg<br>(119 Kg for 98.0%) |
| Ufoxane 3A (Sodium lignosulphonate) | 60 Kg |
| Agrilan ® 789 (hydrophobically modified polyacrylate/Acrylic Copolymer) | 50 Kg |
| Supragil ® WP (sodium (Diisopropylnaphthalenesulphonate) | 50 Kg |
| Silfoam ® SP 150 (Polysiloxane Silicone-based powder antifoam agent) | 25 Kg |
| Ammonium sulfate | 110 kg |
| Sodium bicarbonate | 118 kg |
| Aerosil 150 (Silicon dioxide, chemically prepared) | 20 Kg |
| Tixosil 43 (Precipitated silica) | 20 Kg |
| Break-THRU S 240 (Polyether-modified polysiloxane) | 10 Kg |
| Atlox 4913 - (Hydrophilic methyl methacylate graft copolymer) | 10 Kg |
| Emulsogen TS 540 (2,4,6-Tri-(1-phenylethyl)-phenol polyglycol ether with 54 EO) | 10 Kg |
| DOW PAC ULV Polyanionic Cellulose Polymer | 15 Kg |
| Corn Starch | Up to 1000 kg<br>(about 85.0 kg) |

TABLE 15

| | |
| --- | --- |
| Pymetrozine conc | 27.8-30.7% |
| Dinotefuran conc | 11-12.4% |
| Appearance | Brown granules |
| pH(1%) | 5-8 |
| Density | 0.5-0.65 gr/ml |
| Persistent foam (0.01%; 0.32%) | <60 ml after 1 min. |
| WSR(10%, 75 µm) | >98% |
| Suspensibility (0.01%; 0.32%) | >60% |
| Wettability (10%) | <120s |
| Dispersibility | >60% |
| Water content | <5%* |

*due to use of Pymetrozine Di-hydrate in formulation, % water resulted from the test is a bit higher than in usual formulations (part of Di-hydrate water released)

Preparation Procedure

Stage A: Preparation of Milled Premix

This formulation was prepared by mixing the Pymetrozine Tech. and the Dinotefuran Tech. with Ufoxane 3A, Agrilan® 789, Supragil® WP, Silfoam® SP 150, ammonium sulfate, sodium bicarbonate, Aerosil 150, Tixosil 43, DOW PAC ULV and corn starch. The premix was then milled until a particle size distribution of d90<19 micron was achieved.

Stage B: Preparation of Hydratation Solution

A hydration solution containing 7.5% Break-THRU S 240, 7.5% Atlox 4913 and 7.5% Emulsogen TS 540 and 77.5% water was prepared.

Stage C: Hydratation and Wetting

The milled premix from Stage A was wetted with 14% of hydratation solution from Stage B (for 1000 kg premix, 140 kg hydratation solution). The premix was mixed for 30 minutes (the mixture heated to ~35° C.), and allowed to cool for two hours (minimum).

The premix was wetted with an additional ~10-12% of granulation water, extrusion granulation through 1.2 mm screen was performed and the granules were dried in fluidized bed dryer (Air temp. 65° C.). The dried granules were sieved.

Formulation Example 7

One exemplary embodiment of the formulation is illustrated in Table 16, below:

TABLE 16

| Raw Material | Quantity for 1000 Kg |
| --- | --- |
| Merpan tech. | 500 Kg<br>(532 Kg for 94.0%) |
| Agrilan ® 789 (hydrophobically modified polyacrylate/Acrylic Copolymer) | 20 Kg |
| Supragil ® WP (sodium Diisopropylnaphthalenesulphonate) | 25 Kg |
| Morwet D-500 (sodium salt of naphthalene sulfonate condensate (NSC) with block copolymer) | 100 Kg |
| Ufoxane 3A (Sodium lignosulphonate) | 10 Kg |
| Ammonium sulfate | 78.5 Kg |
| Sodium bicarbonate | 78.5 Kg |
| SILCOLAPSE ® 416; liquid antifoam based on polydimethyl siloxane oil and silica | 20 Kg |
| Ethylan ® NS 500 LQ - (non-ionic surfactant, polyalkoxylated butyl ether) | 15.0 Kg |
| Corn Starch | Up to 1000 kg (about 121.0 kg) |

Preparation Procedure:

1. Stage A: Preparation of Premix.

The Merpan tech. is mixed with Agrilan® 789, Supragil® WP, Morwet D-500, Ufoxane 3A, ammonium sulfate, sodium bicarbonate and corn starch to prepare the premix. The premix is milled to particle size distribution of d90<20 micron.

2. Stage B: Preparation of Wetting Solution.

100 kg of ETHYLAN® NS 500 LQ is dissolved in 800 L water to form a solution.

3. Stage C: Granulation of Merpan 78 WDG

The premix is wetted with wetting solution B. Extrusion granulation through 0.8 mm screen is performed and the granules are dried in fluidized bed dryer. The dried granules are sieved.

4. Stage D: Application of Liquid Antifoaming Agent

The dry granules are sprayed with 2% SILCOLAPSE® 416; liquid antifoam to form the final formulation.

With the information contained herein, various departures from a precise description of the present subject matter will be readily apparent to those skilled in the art to which the present subject matter pertains, without departing from the spirit and the scope of the below claims. The present subject matter is not to be considered limited in scope to the procedures, properties or components defined, since the preferred embodiments and other descriptions are intended only to be illustrative of particular aspects of the presently provided subject matter. Indeed, various modifications of the described modes for carrying out the present subject matter which are obvious to those skilled in the art or related fields are intended to be within the scope of the following claims.

All publications, patents and patent applications mentioned in this specification are herein incorporated in their entirety by reference into the specification, to the same extent as if each individual publication, patent or patent application was specifically and individually indicated to be incorporated herein by reference.

The invention claimed is:

1. A packaged stable, self-dispersible, low foaming granule comprising:
    (a) 70-95% by weight of a single pesticide based on the total weight of the granule selected from the group consisting of captan and folpet;
    (b) 0.2-5% by weight of a silicon(e)-based anti-foaming agent based on the total weight of the granule;
    (c) 3-25% by weight of an effervescent system based on the total weight of the granule, wherein the effervescent system comprises an acid and a base; and
    (d) less than 3% moisture;
        wherein the granule is characterized as any of extruded granule, dry granule, water dispersible granule, soluble granule, and combinations thereof, and
        wherein the anti-foaming agent is selected from the group consisting of silicon(e) on carrier flowable powders; polysiloxane on a neutral carrier; liquid based on polydimethylsiloxane oil and silica;
        wherein the effervescent system in the packaged granule does not react when exposed to the moisture in the granule, and wherein the packaging is sufficiently impermeable to moisture such that the effervescent system comprised in the granule contained in the package does not substantially react when the package is exposed to humid air, and said package contains no additional pesticides other than either captan or folpet, so that the packaged self-dispersible, low foaming granule is stable when the moisture present in the air is any selected from,
        i. less than 40% RH;
        ii. 40% RH or greater than 40% RH;
        iii. from 40% RH to 50% RH; and
        iv. from 50% RH to 60% RH.

2. The packaged granule of claim 1 comprising at least 75% pesticide by weight based upon the total weight of the granule wherein the pesticide consists of captan.

3. The packaged granule of claim 1 comprising at least 75% pesticide by weight based upon the total weight of the granule wherein the pesticide consists of folpet.

4. The packaged granule of claim 1, further comprising 0.1 to 2.5% by weight of a granulation aid agent based on the total weight of the granule, wherein the granulation aid agent is any of a solid granulation aid agent, a liquid granulation aid agent, or a solution of solid or liquid granulation aid in granulation water, wherein the granulation aid agent is selected from the group consisting of polyethylene glycol, polypropylene glycol alkylated polyalkoxylated glycol and any combination thereof.

5. The packaged granule of claim 1, wherein the effervescent system in the packaged granule does not substantially react when exposed to the moisture present in the air when the moisture present in the air is 40% relative humidity or greater than 40% relative humidity.

6. A method for preparing a packaged stable, self-dispersible, low foaming granule comprising:
    (i) mixing a pesticide selected from the group consisting of captan and folpet, an anti-foaming agent, a dispelling system, an effervescent system, and granulation water containing a granulation aid agent selected from the group consisting of polyethylene glycol, polypropylene glycol alkylated polyalkoxylated glycol and any combination thereof to prepare a wetted powder mixture;
    (ii) granulating the wetted powder mixture to obtain granules;
    (iii) drying the granules to a moisture content of less than 3%; and (iv) packing the granules in a package which is sufficiently impermeable to moisture such that the effervescent system in the packaged granule does not substantially react when exposed to the moisture present in the air at less than 40% relative humidity or to the moisture in the granule;

wherein the granule comprises,
(a) 70-95% by weight of a single pesticide based on the total weight of the granule selected from the group consisting of captan and folpet;
(b) 0.2-5% by weight of a silicon(e)-based anti-foaming agent based on the total weight of the granule comprising polysiloxane on a neutral carrier or a liquid based on polydimethylsiloxane oil and silica;
(c) 3-25% by weight of an effervescent system based on the total weight of the granule, wherein the effervescent system comprises an acid and a base;
(d) less than 3% moisture; and
(e) 0.5-25% by weight of a dispelling system based on the total weight of the formulation, wherein the dispelling system comprises a dispersing agent and a wetting agent;

wherein the package contains a single pesticide selected from the group consisting of captan and folpet.

7. The method of claim 6, wherein step (ii) comprises extrusion to obtain extruded granules.

8. The method of claim 6, wherein the effervescent system in the packaged granule does not substantially react when exposed to the moisture present in the air when the moisture present in the air is 40% or greater than 40% relative humidity or to the moisture in the granule.

9. A solution or a dispersion of the packaged granule of claim 1 and water.

10. A packaged stable, self-dispersible, low foaming captan granule comprising:
(a) 78±10% by weight captan,
(b) condensed methyl naphthalene sulfonate, sodium salt,
(c) sodium diisopropyl naphthalene sulphonate,
(d) citric acid/citrate,
(e) sodium bicarbonate,
(f) polysiloxane silicone-based powder antifoam agent,
(g) non-ionic polyalkoxylated butyl ether surfactant, and
(h) less than 3% moisture;

wherein the granule is a dried extruded granule and wherein the packaging contains no additional pesticides other than captan, wherein the package is sufficiently impermeable to moisture such that the effervescent system comprised in the granule contained in the package does not substantially react when the package is exposed to humid air.

11. The packaged granule of claim 10, wherein the effervescent system in the packaged granule does not substantially react when exposed to the moisture present in the air when the moisture present in the air is 40% relative humidity or greater than 40% relative humidity.

12. A packaged stable, self-dispersible, low foaming folpet granule comprising:
(a) 80±10% by weight folpet,
(b) hydrophobically modified polyacrylate/acrylic copolymer,
(c) sodium diisopropyl naphthalene sulphonate,
(d) citric acid/citrate,
(e) sodium bicarbonate,
(f) polysiloxane Silicone-based powder antifoam agent,
(g) non-ionic polyalkoxylated butyl ether surfactant, and
(h) less than 3% moisture;

wherein the granule is a dried extruded granule and wherein the packaging contains no additional pesticides other than folpet, wherein the package is sufficiently impermeable to moisture such that the effervescent system comprised in the granule contained in the package does not substantially react when the package is exposed to humid air.

13. The packaged granule of claim 12, wherein the effervescent system in the packaged granule does not substantially react when exposed to the moisture present in the air when the moisture present in the air is 40% relative humidity or greater than 40% relative humidity.

14. A method for preparing the packaged stable, self-dispersible, low foaming captan granule of claim 10, comprising:
(i) mixing the captan with the condensed methyl naphthalene sulfonate, sodium salt, sodium diisopropyl naphthalene sulphonate, citric acid/citrate, sodium bicarbonate and polysiloxane silicon(e)-based powder antifoam agent to obtain a premix,
(ii) milling the premix to obtain a milled premix,
(iii) wetting the milled premix with granulation water containing 9% of the non-ionic polyalkoxylated butyl ether surfactant to obtain a wetted powder,
(iv) extruding the wetted powder in an extrusion granulator to obtain extruded granules,
(v) drying the extruded granules to a moisture content of less than 3%,
(vi) sieving the dried granules, and
(vii) packing the granules in a package which is sufficiently impermeable to moisture such that the effervescent system comprised in the granule contained in the package does not substantially react when the package is exposed to humid air.

15. The method of claim 14, wherein the effervescent system in the packaged granule does not substantially react when exposed to the moisture present in the air when the moisture present in the air is 40% relative humidity or greater than 40% relative humidity or to the moisture in the granule.

16. A method for preparing the packaged stable, self-dispersible, low foaming folpet granule of claim 12, comprising:
(i) mixing the folpet with the hydrophobically modified polyacrylate/acrylic copolymer, sodium di-isopropyl naphthalene sulphonate, citric acid, sodium bicarbonate and polysiloxane silicon(e)-based powder antifoam agent to obtain a premix,
(ii) milling the premix to obtain a milled premix,
(iii) wetting the milled premix with granulation water containing 4.5% of the non-ionic polyalkoxylated butyl ether surfactant to obtain a wetted powder,
(iv) extruding the wetted powder in an extrusion granulator to obtain extruded granules,
(v) drying the extruded granules to a moisture content of less than 3%,
(vi) sieving the dried granules, and
packing the granules in a package which is sufficiently impermeable to moisture such that the effervescent system comprised in the granule contained in the package does not substantially react when the package is exposed to humid air.

17. The method of claim 16, wherein the effervescent system in the packaged granule does not substantially react when exposed to the moisture present in the air when the moisture present in the air is 40% relative humidity or greater than 40% relative humidity or to the moisture in the granule.

\* \* \* \* \*